(12) United States Patent
Yoshinaga et al.

(10) Patent No.: US 12,178,186 B2
(45) Date of Patent: Dec. 31, 2024

(54) EXCREMENT TREATMENT MATERIAL AND METHOD FOR MANUFACTURING THE SAME

(71) Applicant: DAIKI CO., LTD., Tokyo (JP)

(72) Inventors: Junji Yoshinaga, Tokyo (JP); Shinobu Hatanaka, Tochigi (JP)

(73) Assignee: DAIKI CO., LTD., Tokyo (JP)

( * ) Notice: Subject to any disclaimer, the term of this patent is extended or adjusted under 35 U.S.C. 154(b) by 644 days.

(21) Appl. No.: 17/237,562

(22) Filed: Apr. 22, 2021

(65) Prior Publication Data

US 2021/0235662 A1    Aug. 5, 2021

Related U.S. Application Data

(63) Continuation of application No. PCT/JP2019/045168, filed on Nov. 19, 2019.

(30) Foreign Application Priority Data

Jan. 23, 2019   (JP) ................................. 2019-008886

(51) Int. Cl.
*A01K 1/015*    (2006.01)

(52) U.S. Cl.
CPC .................................. *A01K 1/0155* (2013.01)

(58) Field of Classification Search
CPC ..... A01K 1/0155; A01K 23/00; A01K 1/0152
See application file for complete search history.

(56) References Cited

U.S. PATENT DOCUMENTS

| | | | | |
|---|---|---|---|---|
| 2004/0025798 A1* | 2/2004 | Lee | ...................... | A01K 1/0154 119/172 |
| 2005/0175577 A1* | 8/2005 | Jenkins | ..................... | B01J 20/12 424/76.1 |
| 2008/0022940 A1* | 1/2008 | Kirsch | ................. | A01K 1/0152 119/173 |
| 2010/0136336 A1* | 6/2010 | Borgese | ............... | A01K 1/0152 264/117 |
| 2011/0220031 A1* | 9/2011 | Chen | .................... | A01K 1/0154 119/171 |
| 2014/0230738 A1* | 8/2014 | Goff | ...................... | A01K 1/0155 119/171 |
| 2014/0230739 A1* | 8/2014 | Goff | ..................... | A01K 1/0152 119/171 |

FOREIGN PATENT DOCUMENTS

| | | | | |
|---|---|---|---|---|
| CN | 2872837 | Y | 2/2007 | |
| CN | 101825201 | A | 9/2010 | |
| CN | 201640925 | U | 11/2010 | |
| CN | 108289433 | A | 7/2018 | |
| JP | 2005-110700 | A | 4/2005 | |
| JP | 5379321 | B1 * | 12/2013 | ........... A01K 1/0152 |

OTHER PUBLICATIONS

Feb. 10, 2020 Search Report issued in International Patent Application No. PCT/JP2019/045168.
Jul. 4, 2022 Office Action issued in Chinese Patent Application No. 201980070713.6.

* cited by examiner

*Primary Examiner* — Trinh T Nguyen
(74) *Attorney, Agent, or Firm* — Oliff PLC (57) ABSTRACT

An excrement treatment material is constituted by a water-repellent grain. The grain exhibits a first color before being used, and exhibits a second color that is different from the first color when it is time to replace the grain.

20 Claims, 6 Drawing Sheets

EXCREMENT TREATMENT MATERIAL AND METHOD FOR MANUFACTURING THE SAME

CROSS REFERENCE TO RELATED APPLICATION

This is a Continuation of International Application No. PCT/JP2019/045168 filed Nov. 19, 2019, which claims the benefit of Japanese Application No. 2019-8886 filed Jan. 23, 2019. The contents of these applications are hereby incorporated by reference in their entirety.

TECHNICAL FIELD

The present invention relates to an excrement treatment material and a method for manufacturing the same.

BACKGROUND ART

Patent Document 1 discloses an example of a conventional excrement treatment material. The excrement treatment material described in Patent Document 1 is constituted by a plurality of water-repellent grains and is to be laid in toilets for pets. The toilets for pets are divided into upper spaces and lower spaces by mesh sheets that allow urine to pass therethrough. The water-repellent grains are provided in the upper space. A liquid absorption sheet is provided in the lower space. When a pet urinates, the urine passes through the gaps between the water-repellent grains, and reaches the lower space through the mesh sheet. The urine that has reached the lower space is absorbed by the liquid absorption sheet.

CITATION LIST

Patent Document

Patent Document 1: JP 2005-110700A

SUMMARY OF INVENTION

Technical Problem

The water-repellent grains are different from water-absorbent grains in that the water-repellent grains do not absorb any urine at all, or absorb hardly any urine, and can be repeatedly used over a reasonable period of time (one to two months, for example). In this way, the water-repellent grains are advantageous in that the frequency with which they need to be replaced is markedly lower than that for water absorbent grains, which need to be replaced with each use as a general rule. However, on the other hand, there is a problem with water-repellent grains in that it is easy for the user to forget when it is time to replace the grains because the frequency with which the grains need to be replaced is low. The user forgetting when it is time to replace the grains may result in adverse effects, such as the grains breaking down, the occurrence of foul odors, and the like.

Solution to Problem

The present invention was made in view of the problems described above, and an object thereof is to provide an excrement treatment material and a method for manufacturing the same with which it is easy to tell when it is time to replace the grains.

An excrement treatment material according to the present invention is constituted by a water-repellent grain, wherein the grain exhibits a first color before being used, and exhibits a second color that is different from the first color when it is time to replace the grain.

In the excrement treatment material, the water-repellent grain is configured to exhibit a color (the second color) when it is time to replace the grain, the color being different from another color (the first color) exhibited before the grain is used. For this reason, users can tell when it is time to replace the grain by the change in the color of the grain.

Also, a method for manufacturing an excrement treatment material according to the present invention is a method for manufacturing an excrement treatment material constituted by a water-repellent grain, the method including: a grain forming step of forming the grain, wherein in the grain forming step, the grain is formed so as to exhibit a first color before being used and exhibit a second color that is different from the first color when it is time to replace the grain.

In this manufacturing method, the water-repellent grain is formed so as to exhibit a color (the second color) when it is time to replace the grain, the color being different from another color (the first color) exhibited before the grain is used. For this reason, in the manufactured excrement treatment material, users can tell when it is time to replace the grain by the change in the color of the grain.

Advantageous Effects of Invention

The present invention realizes an excrement treatment material and a method for manufacturing the same with which it is easy to tell when it is time to replace the grains.

DESCRIPTION OF EMBODIMENTS

The following is a detailed description of embodiments of the present invention with reference to the drawings. Note that in the description of the drawings, the same reference numerals are used with the same elements, and redundant descriptions will be omitted.

First Embodiment

Figure 1:
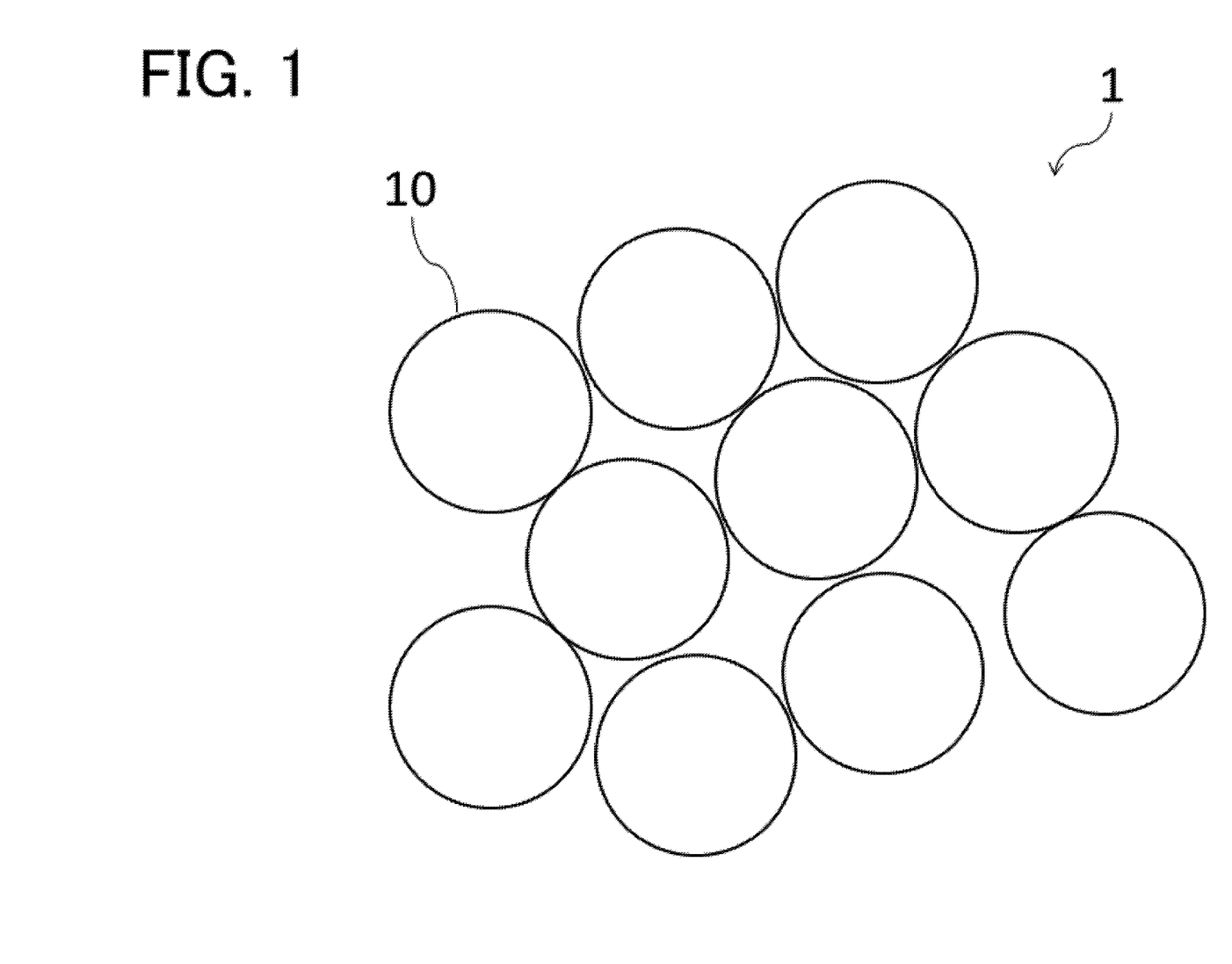
FIG. 1 is a schematic diagram showing a first embodiment of an excrement treatment material according to the present invention.

FIG. 1 is a schematic diagram showing a first embodiment of an excrement treatment material according to the present invention. An excrement treatment material 1 is used for treatment of excrement, and is constituted by a plurality of grains 10. The excrement treatment material 1 may also be a human excrement treatment material that is used to treat excrement of humans, and may also be an animal excrement treatment material that is used to treat excrement of animals such as cats and dogs. The grains 10 are water-repellent.

That is to say that the grains 10 do not absorb liquid such as urine at all, or absorb hardly any liquid such as urine even if they do absorb liquid.

In order to say that the grains 10 are water-repellent, the grains 10 need to have a water repellency of 80% or more as measured in the following test. First, a plurality of grains 10 (a sample) equal to 50 grams is put into a strainer. An empty beaker is set up under the strainer. Then, a syringe without a needle is used to drip 30 ml of water onto the sample over 10 seconds. The sample is left for 1 minute, and then the amount of water in the beaker is measured. The ratio of the measured amount of water to the amount of water that was dripped (30 ml) is used as the water repellency. That is to say that if the amount of water in the beaker is 24 ml or more, the water repellency is therefore 80% or more, and thus the grains 10 are water-repellent. As a reference, the water repellency of regular commercially available absorbent cat litter is around 5%.

Figure 2:
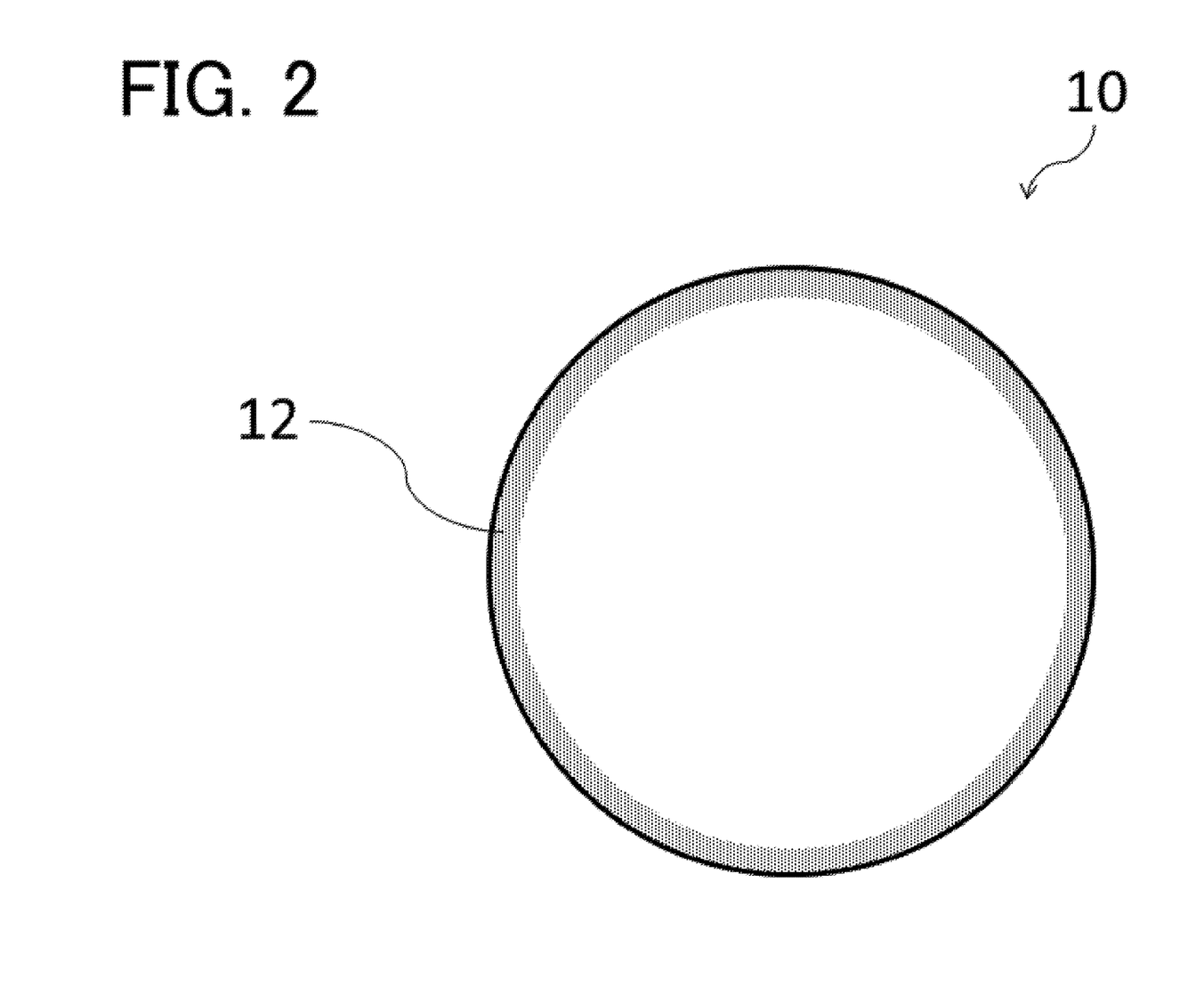
FIG. 2 is a schematic diagram showing a grain 10.

FIG. 2 is a schematic diagram showing the grain 10. Each grain 10 is formed into a granular shape. A sphere, cylinder, ellipsoid or the like are examples of the granular shape. The grain diameter of each grain 10 is around 5 to 15 mm, for example. Here, the grain diameter is defined as the diameter of the smallest sphere that can enclose the grain 10. It is preferable that the main material of the grain 10 is organic matter. Here, the main material is the material that has the largest weight ratio in the grain 10, out of the one or two or more materials that constitute the grain 10. For example, papers, used tea leaves, plastics, bean curd lees, or the like can be used as the organic matter.

The papers refer to a material composed mainly of pulp. Examples of the papers include, in addition to ordinary paper, a vinyl chloride wallpaper classified product (paper obtained by classifying vinyl chloride wallpaper), fluff pulp, papermaking sludge, and pulp sludge. As the plastics, a disposable diaper classified product (plastic obtained by classifying disposable diapers), for example, may be used. The bean curd lees are preferably dried bean curd lees. These materials may be subjected to water repellency treatment.

The materials (except a coloring material 12 that will be described later) that constitute the grain 10 may be one material, or two or more materials. If one material, the main material described above is the only material that constitutes the grain 10. If two or more materials, the grain 10 is constituted by a mix of the main material and another material. Plaster is an example of another material. The water-repellency of the grain 10 can be increased by adding plaster thereto. The plaster may, for example, make up 5 to 15% of the total weight of the grain 10.

The grains 10 exhibit a first color before being used, and exhibit a second color when it is time to replace the grains 10. The second color is different from the first color. However, the first color and the second color need not have different hues. For example, the colors may also be distinguished by shades of the same hue, such as a case in which the first color is dark green and the second color is light green.

In the present embodiment, the grains 10 contain the coloring material 12 (a first coloring material). The coloring material 12 gradually changes from the first color to the second color as time passes. The coloring material 12 is exposed on the surface of each grain 10. The coloring material 12 may be provided only on the surface layer of each grain 10, or may be evenly provided through the entirety of each grain 10. That is to say that it is sufficient that at least some of the coloring material 12 is exposed on the surface of each grain 10. FIG. 2 shows a case in which the coloring material 12 is provided only on the surface layer of each grain 10.

A material whose color changes from the first color to the second color through fading can be used as the coloring material 12. Turmeric, for example, can be used as the material. A material that changes color from the first color to the second color through oxidization may also be used as the coloring material 12. Used tea leaves, for example, can be used as the material. The excrement treatment material 1 may also have a color scale that shows the change from the first color to the second color in such a way that a user can easily determine whether or not the color of the excrement treatment material 1 has changed to the second color.

Next, an example of the method for manufacturing the excrement treatment material 1 will be described as a first embodiment thereof according to the present invention. This manufacturing method includes a grain forming step.

The grain forming step is a step of forming the grains 10. In this step, granules that constitute the grains 10 are formed by granulating a granulating material (the material that constitutes the grains 10) with a granulation apparatus. An extrusion granulator, for example, can be used as the granulation apparatus. That is to say, the granules may be formed by extrusion granulation. The granules may also be subjected to water repellency treatment as necessary. Water repellency treatment can be performed by coating the surface of each granule with a water repellent agent. If water repellency treatment is not performed, it is preferable that crevices are prevented from forming in the granules as much as is possible by increasing the pressure that is applied to the granulating material during granulation. This is because the crevices form a path through which moisture such as urine enters into the grains 10. Prior to the granulation, pretreatment such as pulverization, kneading, and adding water is performed on the granulating material as necessary.

In the grain forming step, the grains 10 are formed so as to exhibit the first color before being used, and exhibit the second color when it is time to replace the grains 10. In the present embodiment, the grains 10 are formed such that the coloring material 12 is exposed on the surface of each grain 10. The grains 10 configured in this way can be formed by, for example, attaching the coloring material 12 to the surface of each granule described above. Specifically, the coloring material 12 can be attached to the surface of each granule by, for example, mixing an adhesive with the coloring material 12, which is a powder, and then coating the surface of each granule. This obtains grains 10 that are each provided with the coloring material 12 on the surface layer only. On the other hand, if there is desire to form the grains 10 with the coloring material 12 evenly provided through the entirety of each grain 10, the coloring material 12 can be added in advance and kneaded in before granulating the granulating material.

The grains 10 can be made to exhibit the second color when it is time to replace the grains 10 (one to two months after the beginning of use, for example) by adjusting the amount of coloring material 12 contained therein.

Note that variables such as the frequency with which the excrement treatment material 1 is used (excretion frequency per day, the amount of excrement per use) have an effect on the speed with which the coloring material 12 changes color, and therefore it is difficult to precisely control the time it takes to change to the second color. However, it is possible to assume a standard frequency with which the excrement treatment material 1 is used in accordance with the application thereof (being used in a toilet for cats, for example), and it is therefore possible to roughly control the time it takes for the color to change to the second color by conducting a simple experiment under that assumption. For example, even if it is difficult to control the change in color such that the color changes to the second color when exactly one month has passed since the beginning of use, it is easy to control the change in color such that the color changes to the second color within one to two months from the beginning of use.

The following describes effects of the present embodiment. In the present embodiment, the water-repellent grains 10 are formed so as to exhibit a color (the second color) when it is time to replace the grains 10, the color being different from another color (the first color) exhibited before the grains 10 are used. For this reason, in the excrement treatment material 1, users can tell when it is time to replace the grains 10 by the change in the color of the grains 10. This therefore realizes the excrement treatment material 1 and the method for manufacturing the same with which it is easy to tell when it is time to replace the grains 10.

The grains 10 contain the coloring material 12 that gradually changes from the first color to the second color as time passes. In this way, it is possible to realize the grains 10 that exhibit the first color before being used, and exhibit the second color when it is time to replace the grains 10, with a simple configuration.

The coloring material 12 is exposed on the surface of each grain 10. In this way, it becomes easier for the user to visually confirm the change from the first color to the second color.

If the color changes from the first color to the second color due to fading of the coloring material 12, the grains 10 gradually fade as time passes, which is therefore advantageous because it is easy for the user to intuitively visually recognize that the time to replace the grains 10 is approaching.

If the color changes from the first color to the second color due to oxidation of the coloring material 12, it becomes more likely that the color of the coloring material 12 (the grains 10) will change significantly, such as the hues of the first and second colors becoming different. This is advantageous because the user can easily determine the change to the second color.

Second Embodiment

Figure 3:
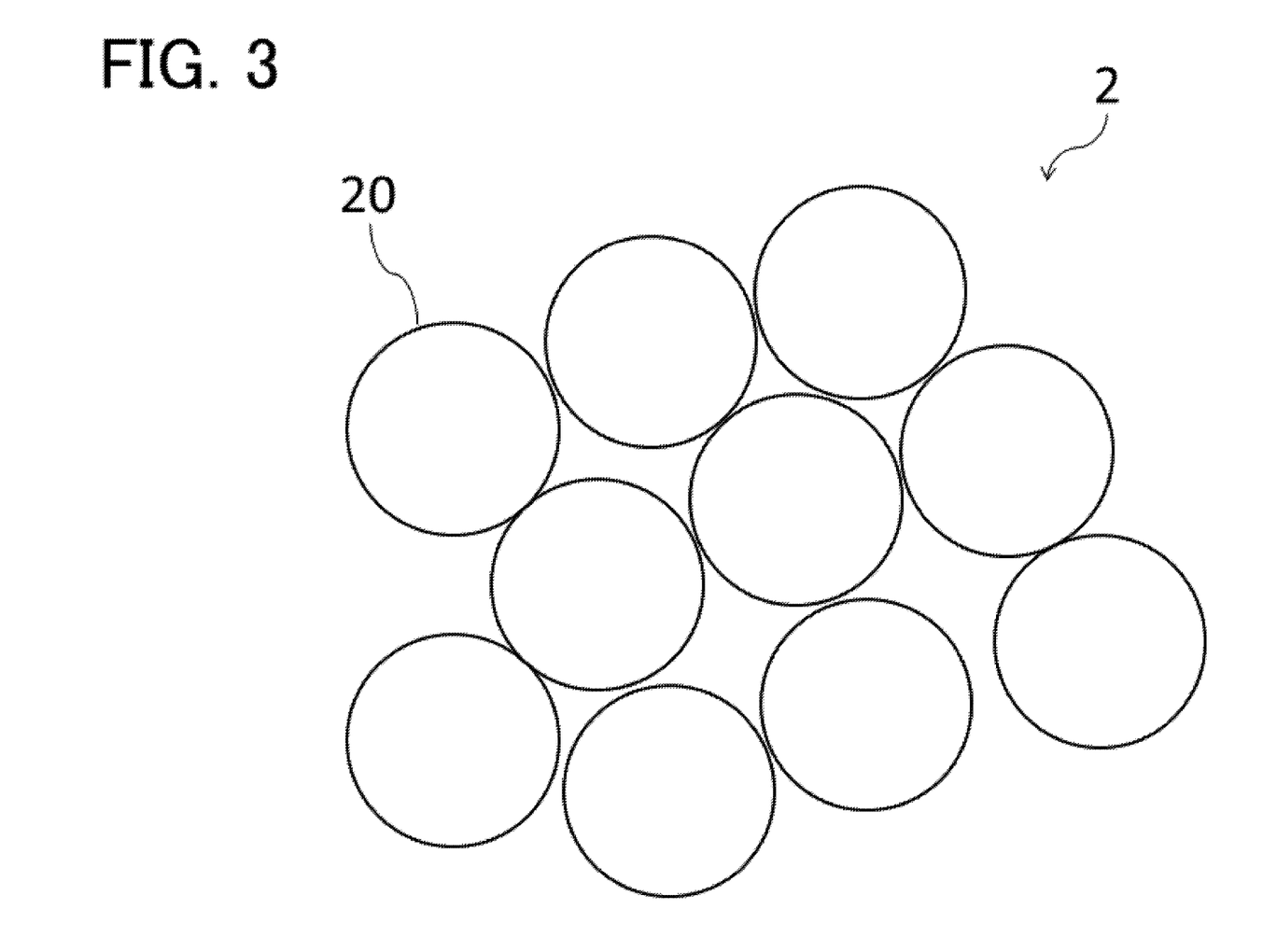
FIG. 3 is a schematic diagram showing a second embodiment of the excrement treatment material according to the present invention.

FIG. 3 is a schematic diagram showing a second embodiment of the excrement treatment material according to the present invention. An excrement treatment material 2 is used for treatment of excrement, and is constituted by a plurality of water-repellent grains 20.

Figure 4:
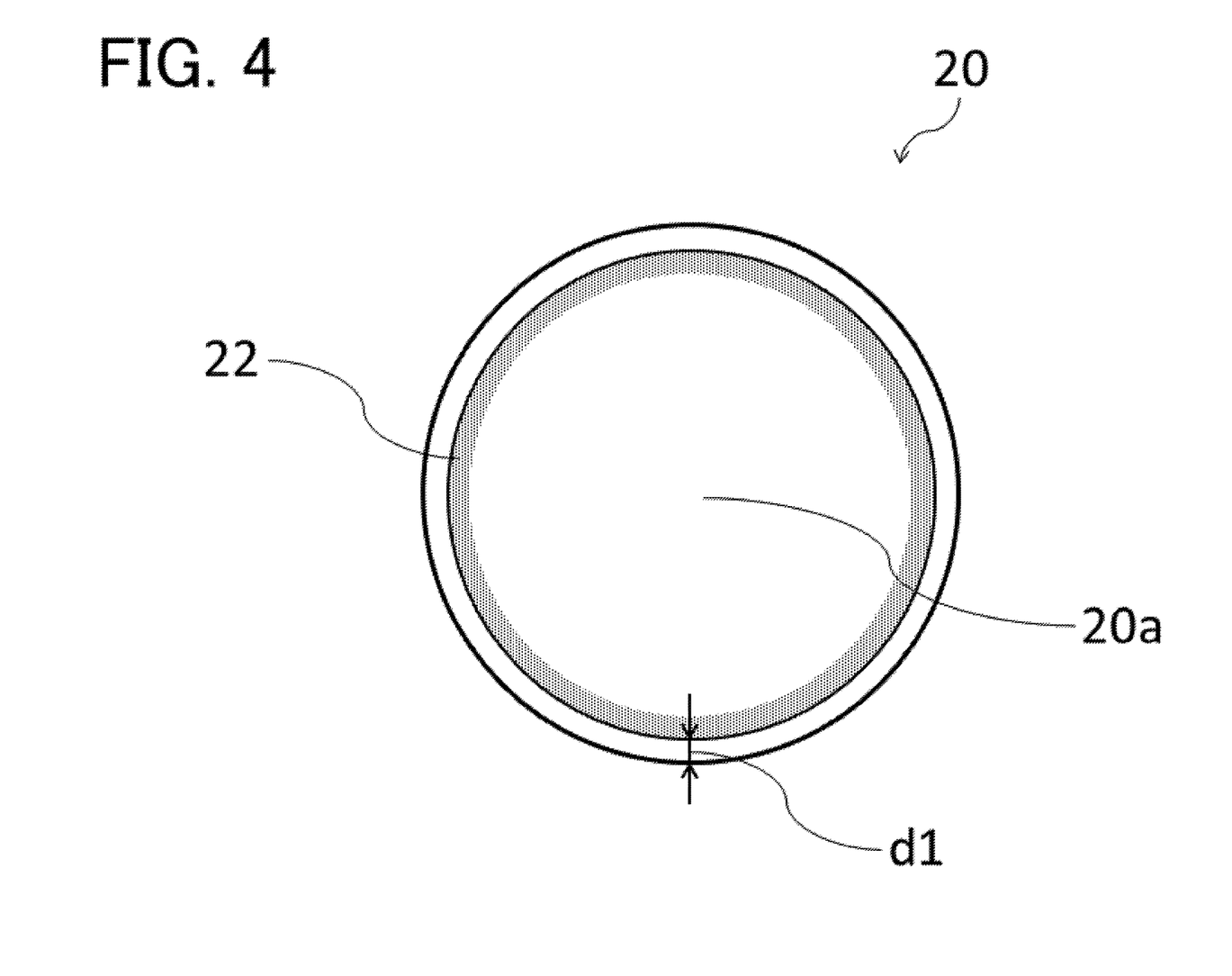
FIG. 4 is a schematic diagram showing a grain 20.

FIG. 4 is a schematic diagram showing the grain 20. The grains 20 exhibit the first color before being used, and exhibit the second color when it is time to replace the grains 20. The grains 20 in the present embodiment are each configured so as to exhibit the second color when loss of the surface of the grain 20 reaches a predetermined amount.

The grains 20 contain a coloring material 22 (a second coloring material) that has the second color. The coloring material 22 is preferably water-insoluble. Colorants, for example, can be used as the coloring material 22. The coloring material 22 is only present in a region 20a that is at a predetermined depth (depth d1) or more from the surface of each grain 20. The depth d1 is around 0.5 to 1.5 mm, for example. The coloring material 22 may be provided only on the surface layer of each region 20a, or may be evenly provided through the entirety of each region 20a. FIG. 4 shows a case in which the coloring material 22 is provided only on the surface of each region 20a. Either way, the coloring material 22 is not exposed on the surface of each grain 20 before being used. Before being used, each grain 20 exhibits the color of the raw material that constitutes the surface of the grain 20 as the first color thereof. Other configurations of the grains 20 are similar to those of the grains 10 described in the first embodiment.

Next, an example of the method for manufacturing the excrement treatment material 2 will be described as a second embodiment of the method for manufacturing the excrement treatment material according to the present invention. This manufacturing method includes a grain forming step.

The grain forming step is a step of forming the grains 20. In this step, granules that constitute the grains 20 are formed by granulating a granulating material (the material that constitutes the grains 20) with a granulation apparatus such as an extrusion granulator. Prior to the granulation, pretreatment such as pulverization, kneading, and adding water is performed on the granulating material as necessary.

In the grain forming step, the grains 20 are formed so as to exhibit the first color before being used, and exhibit the second color when it is time to replace the grains 20. In the present embodiment, the grains 20 are each formed so as to exhibit the second color when loss of the surface of the grain 20 reaches a predetermined amount. Specifically, the grains 20 are each formed such that the coloring material 22 is only present in the region 20a that is at a predetermined depth or more from the surface of the grain 20. The configuration of the grains 20 can also be formed in the following way, for example. First, granules that constitute the region 20a are formed by granulating the granulating material. Then, the coloring material 22 is attached to the surface of each granule. Then, the outer portion of each region 20a can be formed by attaching a water-repellent material to the surface of the region 20a, thereby covering the coloring material 22. Alternatively, it is also possible for the grains 20 with the configuration described above to be formed by granulating the granulating material to form the granules that correspond to the grains 20, and thereafter injecting the coloring material 22 into each region 20a.

The following describes effects of the present embodiment. In the present embodiment, the water-repellent grains 20 are formed so as to exhibit a color (the second color) when it is time to replace the grains 20, the color being different from another color (the first color) exhibited before the grains 20 are used. For this reason, in the excrement treatment material 2, users can tell when it is time to replace the grains 20 by the change in the color of the grains 20. This therefore realizes the excrement treatment material 2 and method for manufacturing the same with which it is easy to tell when it is time to replace the grains 20.

Each grain 20 is configured so as to exhibit the second color when loss of the surface of the grain 20 reaches a predetermined amount. The surface of each grain 20 is gradually lost with use, and therefore reaching a predetermined amount of loss is an indication that it is time to replace the grains 20. Therefore, by making each grain 20 exhibit the second color when loss of the surface of the grain 20 reaches a predetermined amount, it is possible to reliably match the time when the color changes to the second color with the time when the grains 20 need to be replaced.

The grains 20 contain the coloring material 22 that has the second color, and the coloring material 22 is present only in the region 20a that is at a predetermined depth or more from the surface of each grain 20. In this way, it is possible to realize the grains 20 that exhibit the second color when loss of the surface of the grain 20 reaches a predetermined amount, with a simple configuration. That is to say that once the surfaces are lost and the regions 20a are exposed, it becomes possible to visually confirm the coloring material 22, and the grains 20 exhibit the second color.

In the case where the coloring material 22 is water-insoluble, even if moisture enters into the grains 20, it is possible to prevent a situation in which the coloring material 22 dissolves in the moisture and seeps to the outer side of each region 20a. Seeping of the coloring material 22 to the outer side of the region 20a can lead to the grain 20 exhibiting the second color before loss of the surface of the grain 20 reaches a predetermined amount.

Third Embodiment

Figure 5:
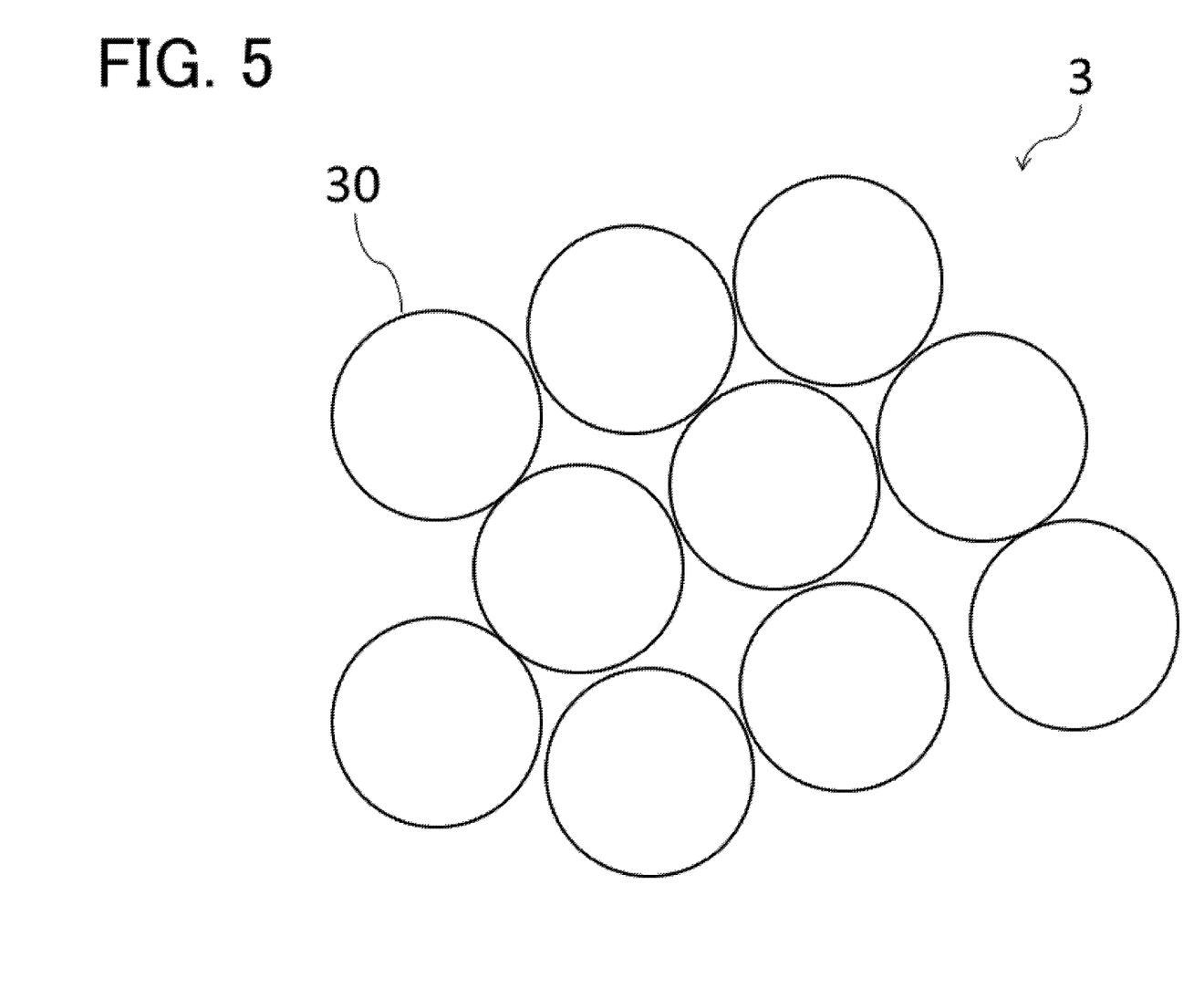
FIG. 5 is a schematic diagram showing a third embodiment of the excrement treatment material according to the present invention.

FIG. 5 is a schematic diagram showing a third embodiment of the excrement treatment material according to the present invention. An excrement treatment material 3 is used for treatment of excrement, and is constituted by a plurality of water-repellent grains 30.

Figure 6:
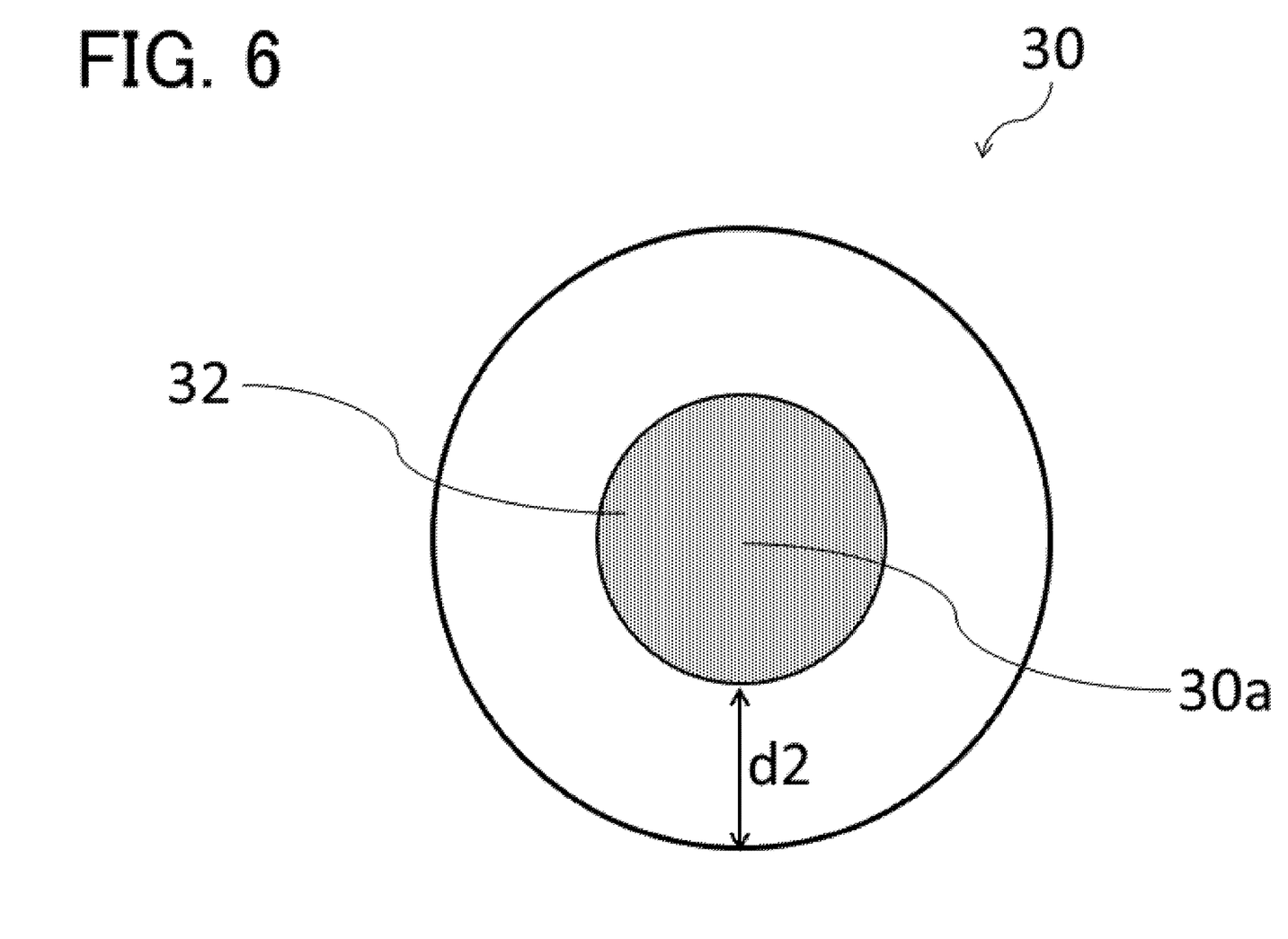
FIG. 6 is a schematic diagram showing a grain 30.

FIG. 6 is a schematic diagram showing the grain 30. The grains 30 exhibit the first color before being used, and exhibit the second color when it is time to replace the grains 30. The grains 30 in the present embodiment are each configured so as to exhibit the second color when moisture that has entered into the grain 30 reaches a predetermined amount.

The grains 30 contain a coloring material 32 (a third coloring material) that exhibits the second color upon reacting to moisture. The coloring material 32 is water-soluble. Dyes, for example, can be used as the coloring material 32. The coloring material 32 is present only in a region 30a that is at a predetermined depth (depth d2) or more from the surface of each grain 30. The depth d2 is around 1.5 to 3 mm, for example. The coloring material 32 may be provided only on the surface layer of each region 30a, or may be evenly provided through the entirety of each region 30a. FIG. 6 shows a case in which the coloring material 32 is evenly provided through the entirety of each region 30a. Either way, the coloring material 32 is not exposed on the surface of each grain 30 before being used. Before being used, the grains 30 exhibit the color of the raw material that constitutes the surface of each grain 30 as the first color. Other configurations of the grains 30 are similar to those of the grains 10 described in the first embodiment.

Next, an example of the method for manufacturing the excrement treatment material 3 will be described as a third embodiment of the method for manufacturing the excrement treatment material according to the present invention. This manufacturing method includes a grain forming step.

The grain forming step is a step of forming the grains 30. In this step, granules that constitute the grains 30 are formed by granulating a granulating material (the material that constitutes the grains 30) with a granulation apparatus such as an extrusion granulator. Prior to the granulation, pretreatment such as pulverization, kneading, and adding water is performed on the granulating material as necessary.

In the grain forming step, the grains 30 are formed so as to exhibit the first color before being used, and exhibit the second color when it is time to replace the grains 30. In the present embodiment, the grains 30 are each formed so as to exhibit the second color when the amount of moisture that has entered into the grain 30 reaches a predetermined amount. Specifically, the grains 30 are each formed such that the coloring material 32 is present only in the region 30a that is at a predetermined depth or more from the surface of the grain 30. The grains 30 with this configuration can also be formed in the following way, for example. First, granules that correspond to the regions 30a are formed by granulating the granulating material, to which the coloring material 32 has been added in advance and mixed therein. Then, the outer side portion of each region 30a is formed by attaching a water-repellent material to the surface of each granule.

The following describes effects of the present embodiment. In the present embodiment, the water-repellent grains 30 are formed so as to exhibit a color (the second color) when it is time to replace the grains 30, the color being different from another color (the first color) exhibited before the grains 30 are used. For this reason, in the excrement treatment material 3, users can tell when it is time to replace the grains 30 by the change in the color of the grains 30. This therefore realizes the excrement treatment material 3 and the method for manufacturing the same with which it is easy to tell when it is time to replace the grains 30.

The grains 30 are each configured so as to exhibit the second color when moisture that has entered into the grain 30 reaches a predetermined amount. Moisture gradually enters into the grains 30 with use, and therefore the moisture reaching a predetermined amount is an indication that it is time to replace the grains 30. Therefore, by making each grain 30 exhibit the second color when the moisture that enters into the grain 30 reaches a predetermined amount, it is possible to reliably match the time when the color changes to the second color with the time when the grains 30 need to be replaced.

The grains 30 contain the coloring material 32 that reacts to moisture and exhibits the second color, and the coloring material 32 is present only in the region 30a that is at a predetermined depth or more from the surface of each grain 30. In this way, it is possible to realize the grains 30 that each exhibit the second color when moisture that has entered into the grains 30 reaches a predetermined amount, with a simple configuration. That is to say, once the moisture that has entered into the grains 30 from the outside thereof reaches the regions 30a, the grains 30 exhibit the second color due to the coloring material 32 reacting to the moisture and seeping to the surface of each grain 30.

LIST OF REFERENCE NUMERALS

1 Excrement treatment material
2 Excrement treatment material
3 Excrement treatment material
10 Grain
12 Coloring material (first coloring material)
20 Grain
22 Coloring material (second coloring material)
30 Grain
32 Coloring material (third coloring material)

The invention claimed is:

1. An excrement treatment material constituted by a water-repellent grain, wherein:
the water-repellent grain exhibits a first color before being used, and exhibits a second color that is different from the first color when it is time to replace the water-repellent grain, and
the water-repellent grain before being used has a water repellency of 80% or more as measured by:
dripping water onto a sample of a plurality of the water-repellant grain placed on a strainer, and
1 minute after the dripping, calculating a ratio of water that is passed through the strainer compared to a total amount of water dripped onto the sample.

2. The excrement treatment material according to claim 1, wherein the water-repellent grain contains a coloring material that gradually changes from the first color to the second color as time passes.

3. The excrement treatment material according to claim 2, wherein the coloring material is exposed on a surface of the water-repellent grain.

4. The excrement treatment material according to claim 2, wherein the coloring material changes from the first color to the second color due to fading.

5. The excrement treatment material according to claim 2, wherein the coloring material changes from the first color to the second color due to oxidation.

6. The excrement treatment material according to claim 1, wherein the water-repellent grain is configured so as to exhibit the second color when loss of a surface of the water-repellent grain reaches a predetermined amount.

7. The excrement treatment material according to claim 6, wherein the water-repellent grain contains a coloring material that has the second color, and
the coloring material is present only in a region that is at a predetermined depth or more from the surface of the water-repellent grain.

8. The excrement treatment material according to claim 7, wherein the coloring material is water-insoluble.

9. The excrement treatment material according to claim 1, wherein the water-repellent grain is configured so as to exhibit the second color when moisture that has entered into the water-repellent grain reaches a predetermined amount.

10. The excrement treatment material according to claim 9, wherein the water-repellent grain contains a coloring material that exhibits the second color upon reacting to moisture.

11. The excrement treatment material according to claim 10, wherein the coloring material is present only in a region that is at a predetermined depth or more from a surface of the water-repellent grain.

12. A method for manufacturing an excrement treatment material constituted by a water-repellent grain, the method comprising:
a grain forming step of forming the water-repellent grain, wherein:
in the grain forming step, the water-repellent grain is formed so as to exhibit a first color before being used and exhibit a second color that is different from the first color when it is time to replace the water-repellent grain, and
the water-repellent grain before being used has a water repellency of 80% or more as measured by:
dripping water onto a sample of a plurality of the water-repellant grain placed on a strainer, and
1 minute after the dripping, calculating a ratio of water that is passed through the strainer compared to a total amount of water dripped onto the sample.

13. The method for manufacturing the excrement treatment material according to claim 12, wherein in the grain forming step, a granule that constitutes the water-repellent grain is formed through extrusion granulation.

14. The method for manufacturing the excrement treatment material according to claim 12, wherein in the grain forming step, the water-repellent grain is formed containing a coloring material that gradually changes from the first color to the second color as time passes.

15. The method for manufacturing the excrement treatment material according to claim 14, wherein in the grain forming step, the water-repellent grain is formed such that the coloring material is exposed on a surface of the water-repellent grain.

16. The method for manufacturing the excrement treatment material according to claim 12, wherein in the grain forming step, the water-repellent grain is formed so as to exhibit the second color when loss of a surface of the water-repellent grain reaches a predetermined amount.

17. The method for manufacturing the excrement treatment material according to claim 16, wherein in the grain forming step, the water-repellent grain is formed such that a coloring material having the second color is present only in a region that is at a predetermined depth or more from the surface of the water-repellent grain.

18. The method for manufacturing the excrement treatment material according to claim 12, wherein in the grain forming step, the water-repellent grain is formed so as to exhibit the second color when moisture that has entered into the water-repellent grain reaches a predetermined amount.

19. The method for manufacturing the excrement treatment material according to claim 18, wherein in the grain forming step, the water-repellent grain is formed containing a coloring material that exhibits the second color upon reacting to moisture.

20. The method for manufacturing the excrement treatment material according to claim 19, wherein in the grain forming step, the water-repellent grain is formed such that the coloring material is present only in a region that is at a predetermined depth or more from a surface of the water-repellent grain.

* * * * *